United States Patent
Ward et al.

(10) Patent No.: US 8,926,462 B2
(45) Date of Patent: Jan. 6, 2015

(54) TENSIONER

(71) Applicant: The Gates Corporation, Denver, CO (US)

(72) Inventors: Peter Ward, Farmington Hills, MI (US); Eva Bernert, Alsdorf (DE); Casper Haenbeukers, Landgraaf (NL); John T Harvey, Novi, MI (US); Fraser Lacy, Aachen (DE)

(73) Assignee: The Gates Corporation, Denver, CO (US)

( * ) Notice: Subject to any disclaimer, the term of this patent is extended or adjusted under 35 U.S.C. 154(b) by 311 days.

(21) Appl. No.: 13/659,422

(22) Filed: Oct. 24, 2012

(65) Prior Publication Data

US 2014/0113755 A1 Apr. 24, 2014

(51) Int. Cl.
*F16H 7/12* (2006.01)
*F16H 7/08* (2006.01)

(52) U.S. Cl.
CPC ............... *F16H 7/12* (2013.01); *F16H 7/1218* (2013.01); *F16H 7/1281* (2013.01); *F16H 7/1209* (2013.01); *F16H 2007/081* (2013.01); *F16H 2007/088* (2013.01)
USPC .......................................... 474/112; 474/135

(58) Field of Classification Search
CPC ....... F16H 7/12; F16H 7/1209; F16H 7/1218; F16H 7/1281; F16H 2007/081; F16H 2007/088
USPC ........................... 474/112, 117, 133, 135, 138
See application file for complete search history.

(56) References Cited

U.S. PATENT DOCUMENTS

| | | | |
|---|---|---|---|
| 5,919,107 A | 7/1999 | Stepniak | |
| 6,932,731 B2 * | 8/2005 | Kaiser et al. | 474/135 |
| 7,946,938 B2 * | 5/2011 | Hallen | 474/135 |
| 7,951,030 B2 | 5/2011 | Ward et al. | |
| 8,292,765 B2 * | 10/2012 | Rolando et al. | 474/112 |
| 2006/0068957 A1 * | 3/2006 | Stone et al. | 474/135 |
| 2008/0171622 A1 * | 7/2008 | Schever | 474/135 |
| 2010/0144473 A1 * | 6/2010 | Ward et al. | 474/112 |
| 2010/0190594 A1 * | 7/2010 | Rolando et al. | 474/112 |
| 2012/0316018 A1 * | 12/2012 | Ward et al. | 474/135 |
| 2012/0316019 A1 * | 12/2012 | Ward et al. | 474/135 |

FOREIGN PATENT DOCUMENTS

| | | |
|---|---|---|
| DE | 10260552 A1 | 7/2004 |
| WO | 2006/111988 A1 | 10/2006 |

OTHER PUBLICATIONS

European Patent Office, International Search Report, mailing date Mar. 7, 2014.

* cited by examiner

*Primary Examiner* — William E Dondero
*Assistant Examiner* — Robert T Reese
(74) *Attorney, Agent, or Firm* — Jeffrey A. Thurnau, Esq.; Paul N. Dunlap, Esq.

(57) ABSTRACT

A tensioner comprising a base, a shaft connected to the base, an eccentric adjuster coaxially engaged with the shaft, an arm pivotally engaged with the shaft, a pulley journalled to the arm, a torsion spring engaged between the arm and the base, the arm comprising a first receiving portion and a second receiving portion disposed axially opposite from the first receiving portion, a first damping member disposed between the arm and the base, the first damping member frictionally engaged with the base and engaged with first receiving portion, a second damping member disposed between the arm and the eccentric adjuster having a member engaged with the second receiving portion, and a biasing member disposed between the first damping member and the arm for applying a normal force to the first damping member and to the second damping member.

5 Claims, 8 Drawing Sheets

TENSIONER

FIELD OF THE INVENTION

The invention relates to a tensioner, and more particularly, a tensioner having a first damping member and a second damping member cooperatively connected to allow a relative axial movement and a compressive member disposed therebetween urging apart the first damping member and the second damping member.

BACKGROUND OF THE INVENTION

The two most common methods synchronously driving rotating members such as cam shafts and balance shafts from a crankshaft are timing chains and belts. Timing chains require engine oil to operate. In comparison most timing belt applications require that no oil be present in the belt drive as the presence of oil can damage the belt and inhibit its intended purpose. Recent improvements in belts no long require that a belt be isolated from the engine oil environment.

The recent improvement of belts to operate in oil, however poses other problems that need to be solved. One specific problem is properly tensioning the belt drive to keep the camshaft synchronized with the crankshaft. Should the camshaft or other synchronized driven crankshaft component loose synchronization with the crankshaft catastrophic engine damage can result.

To transmit power through the belt from the rotating crankshaft one side of the belt is pulled around the crankshaft and is commonly referred to as the belt tight side by those skilled in the art. Conversely the other side is referred to as the belt slack side, since the belt is being "pushed" away from the crankshaft. It is important to provide tensioning to the slack side of the belt to prevent the belt from becoming unduly slack and thus causing a loss of synchronization between the crankshaft and the components rotated by the crankshaft. This loss of synchronization is commonly referred to as "tooth jump" or "ratcheting" by those skilled in the art.

Compounding the problem of eliminating belt slack to prevent tooth jump or ratcheting is excessive tensioner arm motion or vibration induced by the engine's angular vibration. Excessive arm motion could not only lead to a tooth jump or ratcheting condition, but can also reduce the useful life of the tensioner and the belt as well. To minimize the amount of arm vibration friction damping is commonly used to prevent the tensioner from moving away from the belt.

The presence of oil makes friction damping difficult to achieve. Application of a lubricant to two rubbing surfaces will allow relative motion between the two surfaces to occur more easily.

Representative of the art is U.S. Pat. No. 7,951,030 which discloses a tensioner comprising a base, an arm pivotally engaged with the base, a pulley journalled to the arm, a torsion spring engaged between the arm and the base, the base comprising a cantilever leaf spring, a first friction disk operationally disposed between the cantilever leaf spring and the arm, the cantilever leaf spring biasing the first friction disk into frictional contact with the arm, the first friction disk rotationally fixed with respect to the base, a second friction disk rotationally fixed with respect to the base, a separator member disposed between the first friction disk and the second friction disk, the first friction disk and the second friction disk each having a wet coefficient of friction of approximately 0.12, and the separator member rotationally fixed with respect to the arm.

What is needed is a tensioner having a first damping member and a second damping member cooperatively connected to allow a relative axial movement and a compressive member disposed therebetween urging apart the first damping member and the second damping member. The present invention meets this need.

SUMMARY OF THE INVENTION

The primary aspect of the invention is to provide a tensioner having a first damping member and a second damping member cooperatively connected to allow a relative axial movement and a compressive member disposed therebetween urging apart the first damping member and the second damping member.

Other aspects of the invention will be pointed out or made obvious by the following description of the invention and the accompanying drawings.

The invention comprises a tensioner comprising a base, a shaft connected to the base, an eccentric adjuster coaxially engaged with the shaft, an arm pivotally engaged with the shaft, a pulley journalled to the arm, a torsion spring engaged between the arm and the base, the arm comprising a first receiving portion and a second receiving portion disposed axially opposite from the first receiving portion, a first damping member disposed between the arm and the base, the first damping member frictionally engaged with the base and engaged with first receiving portion, a second damping member disposed between the arm and the eccentric adjuster having a member engaged with the second receiving portion, and a biasing member disposed between the first damping member and the arm for applying a normal force to the first damping member and to the second damping member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
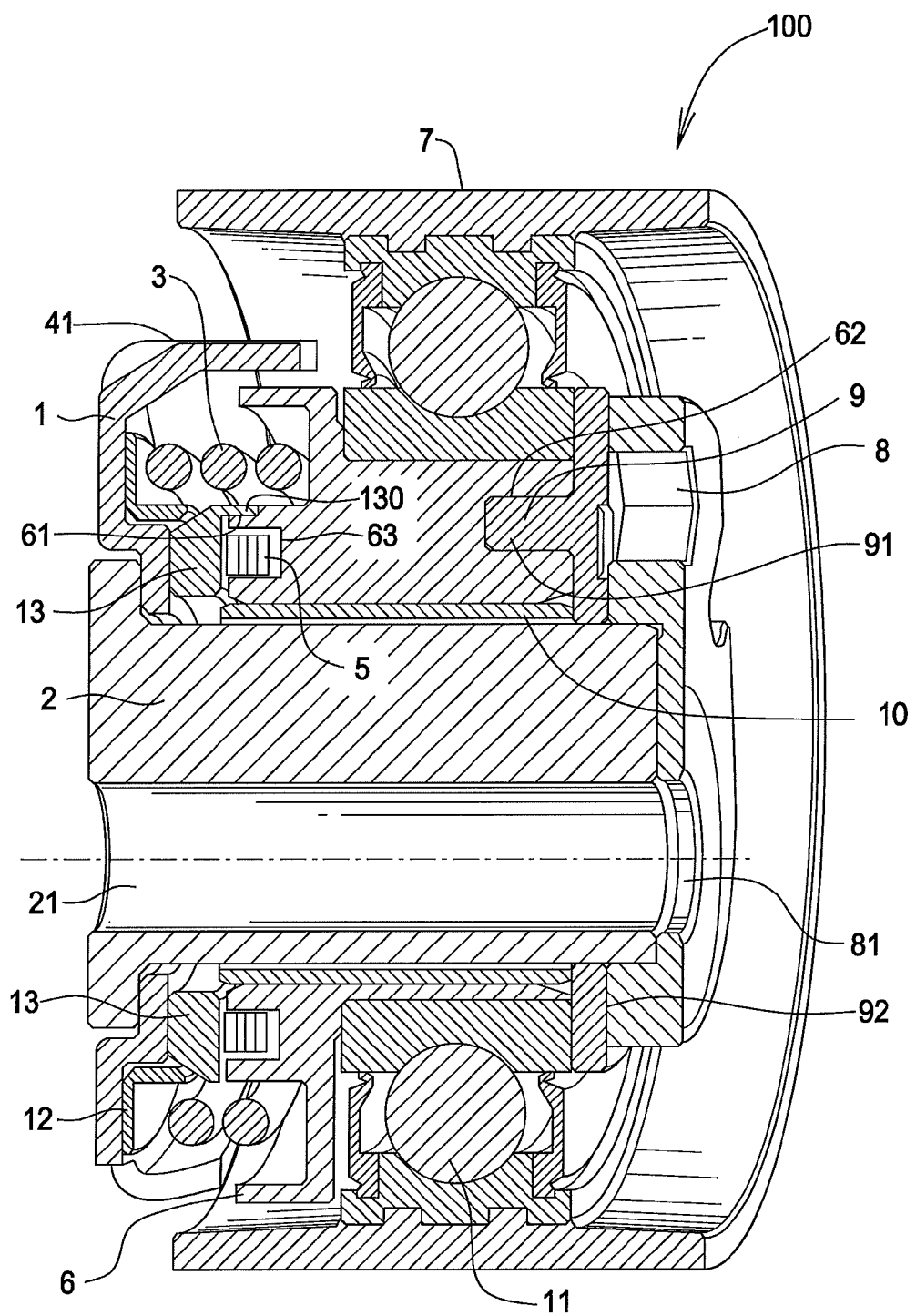
FIG. 1 is a cross-sectional view of the tensioner.

FIG. 1 is a cross-sectional view of the tensioner. Tensioner 100 comprises a pulley 7 which engages a belt (not shown) to thereby provide a belt tension or load. Pulley 7 is journalled to arm 6 with a bearing 11. Pulley is engaged with the bearing outer race. Bearing 11 comprises a ball bearing as shown, but could also comprise a needle bearing or other suitable bearing known in the art.

Arm 6 is biased by torsion spring 3 thereby urging a pulley 7 into engagement with a belt which applies a tensile load to the belt. Torsion spring 3 is operationally disposed between base 1 and arm 6.

Arm 6 pivots about shaft 2. Pivotal movement of arm 6 allows the tensioner to compensate for any changes in belt length as the belt stretches over time and as the drive length changes from thermal expansion. Arm 6 pivots about a low-friction bushing 10 about shaft 2. Shaft 2 is press fit into base 1 and extends normally from base 1.

Eccentric adjuster 8 is also press fit to the end of shaft 2 opposite base 1. Eccentric adjuster 8 is used to rotate the tensioner into proper engagement with the belt during installation. Eccentric refers to the center of hole 21 not being coaxial with a center of rotation of pulley 7 or of arm 6. Eccentric adjuster 8 is used to properly load the belt with a predefined tension by compensating for all component and system tolerances. A tool (not shown) engages the adjuster at tool receiving portion 82. Eccentric adjuster 8 is used only during belt installation. It is locked in place once the belt is installed by fully engaging a fastener inserted through a hole 21, 81 into a mounting surface.

To minimize the amount of arm oscillation or movement during operation friction damping is used. Excessive arm motion induced by the engine vibration could cause the belt to jump a tooth or "ratchet". Tooth jump or ratcheting of the belt causes a loss of synchronization between the driven and driving shaft(s) of the belt.

Wave spring 5 is disposed between damping member 13 and arm 6. Wave spring 5 imparts a normal force upon damping member 13. Damping member 13 bears frictionally upon base 1, thereby damping an oscillation of arm 6. Damping member 13 is generally a toroid in shape, but may also be disk shaped. Torsion spring 3 is compressed between arm 6 and pad 12. Pad 12 is mechanically engaged with base 1 wherein tangs 120 engage each side of a tab 41. Being thus engaged pad 12 is constrained against rotation relative to base 1.

Figures 2, 2B:
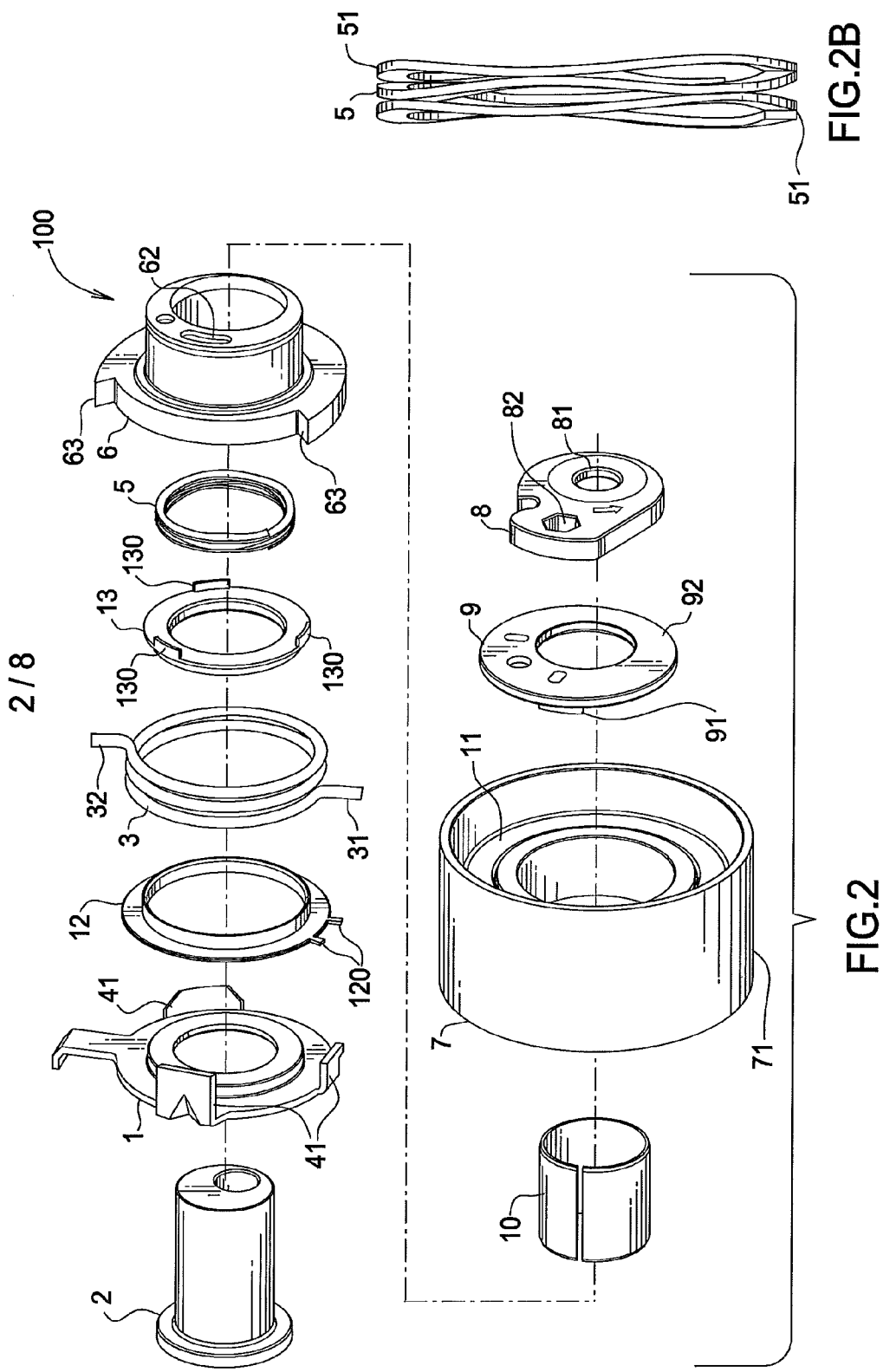
FIG. 2 is an exploded view of the tensioner.
FIG. 2b is a side view of the wave spring.

FIG. 2 is an exploded view of the tensioner. Damping member 13 creates friction damping between arm 6 and base 1. Damping disk 9 is also used to create friction damping between arm 6 and eccentric adjuster 8. Frictional surface engages eccentric adjuster 8. Damping member 13 and damping disk 9 are disposed on axially opposite ends of arm 6.

Damping member 13 and damping disk 9 each move rotationally with arm 6, while base 1 and eccentric adjuster 8 are fixed to the mounting surface, such as an engine (not shown). Pulley surface 71 may be flat, multi-ribbed or toothed to accommodate a suitable belt.

An end 31 of spring 3 engages tab 41, wherein tab 41 acts as a reaction point on base 1. The other end 32 of spring 3 engages arm 6.

Rotation of arm 6 is limited by stops 63 coming into contact with a tab 41.

FIG. 2b is a side view of the wave spring. The wave spring comprises multiple coils 51. Each coil comprises undulations wherein each coil comes into contact with an adjacent coil at a limited number of locations approximately 120° apart. This description is not intended to limit the coil design of the spring. Each spring may have more or fewer undulations per coil depending on design requirements. It may also comprise one or more coils. In an alternate embodiment the wave spring comprises only one coil with ends joined.

Figure 3:
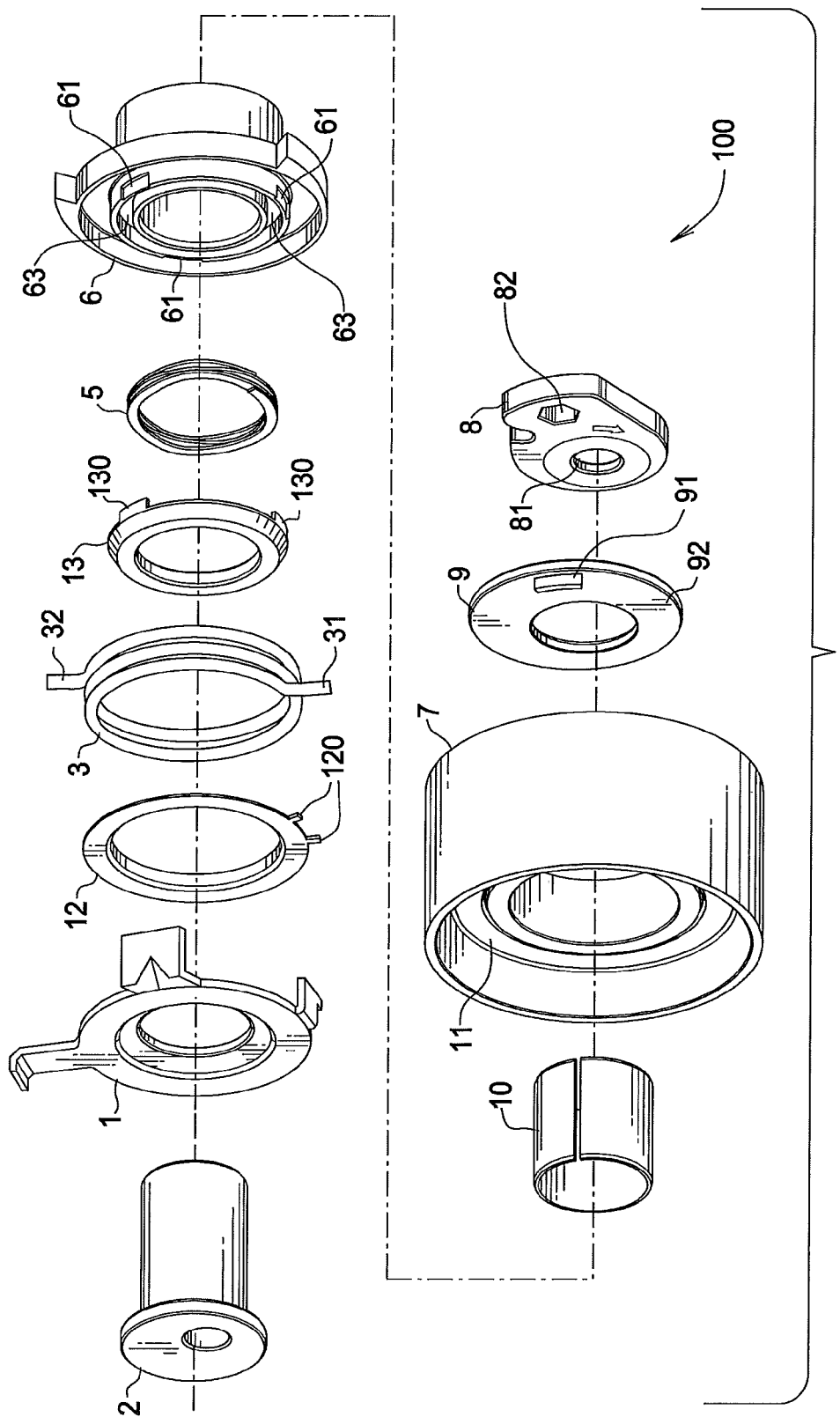
FIG. 3 is an exploded view of the tensioner.

FIG. 3 is an exploded view of the tensioner. Torque from arm 6 is transferred through keyway 61 to tab 130 thereby causing damping member 13 to move in locked unison with arm 6. Keyway 61 is disposed at an axial end of arm 6. Base 1 comprises tabs 41 (three are shown) which extend in a substantially axial direction.

Torque from arm 6 is transferred through keyways 62. Keyways 62 are disposed at an axial end of arm 6 opposite keyway 61. Damping disk 9 comprises a tab 91 which extends in the axial direction. Tab 91 engages a keyway 62. Rotation of arm 6 causes locked rotation of damping disk 9 through interaction of keyway 62 and tab 91.

Damping member 13 and damping disk 9 are loaded normally by compression of wave spring 5 thereby creating normal force friction. This arrangement compensates for wear and assembly tolerances. Wave spring 5 is captured between damping member 13 and arm 6 in a receiving portion 63. Spring 5 rotates with arm 6 ensuring that relative motion only occurs between damping member 13 and base 1, as well as only between damping disk 9 and eccentric adjuster 8.

Spring 5 is shown as a wave spring which is preferred due to its spring rate characteristic and area of surface contact. FIG. 2b is a side view of the wave spring. In this embodiment spring 5 comprises multiple coils or volutes, each having a wave profile. This allows suitable control of the axial (or normal) force relative to the tolerances of the tensioner assembly. The force of the wave spring in combination with the compression of torsion spring 3, and further in conjunction with the coefficient of friction of mating parts determines the damping level of the tensioner assembly. In alternate embodiments spring 5 may comprise a single coil wave spring.

The coefficient of friction of the various mating parts is as follows:

| Part | CoF |
| --- | --- |
| Damping member 13 against base 1 | ≤0.4 |
| Damping disk 9 against adjuster 8 | ≤0.4 |
| Damping disk 18 against base 11 | ≤0.4 |
| Damping disk 19 against arm 20 | ≤0.4 |

Figure 6:
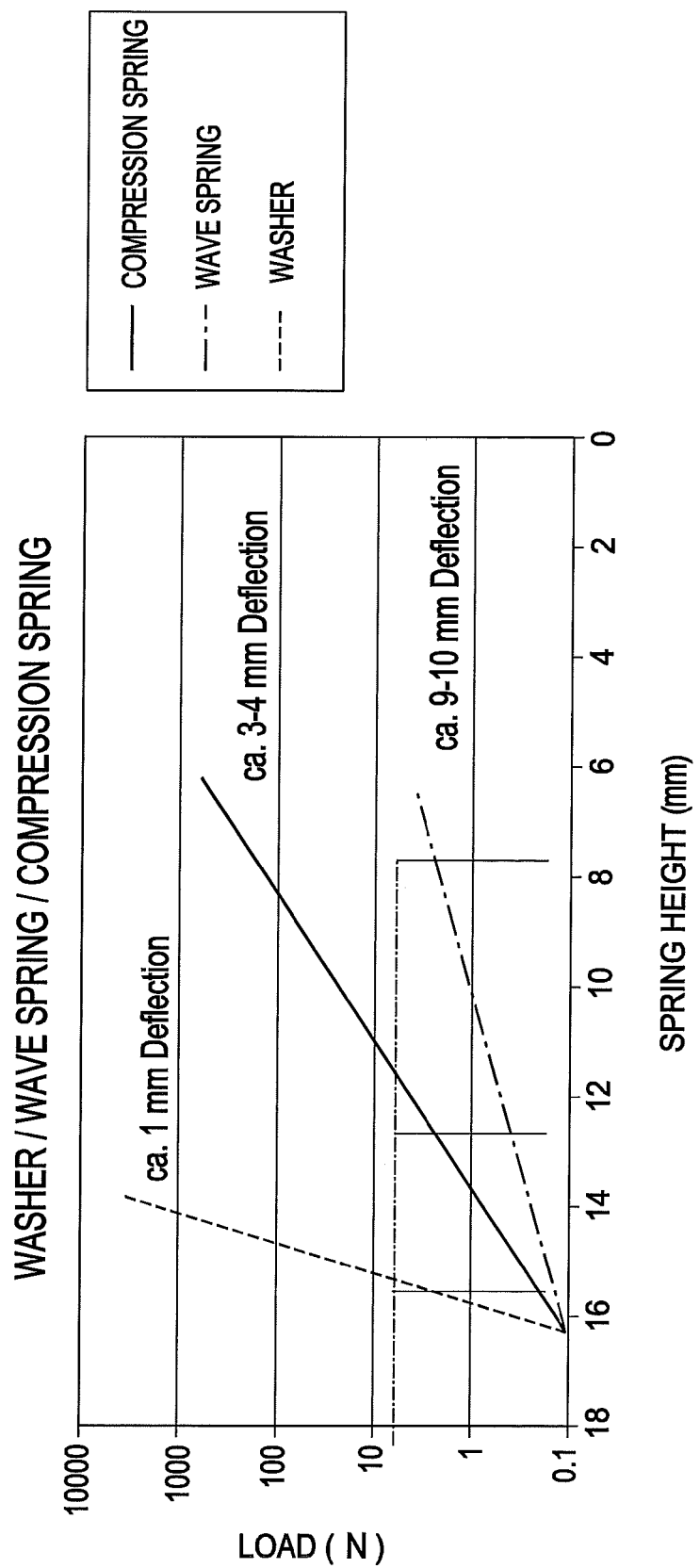
FIG. 6 is a chart illustrating the spring rate (k) as a function of spring height.

Damping member 13 and damping disk 9 may comprise any known frictional material used in a tensioner damping application, including oil resistant metals and polymers. Alternate embodiments may produce sufficient axial force by use of the torsion spring 3 in compression without use of the wave spring. FIG. 6 is a chart illustrating the spring rate (k) as a function of spring height. Total compression is indicated for each spring type, namely, spring washer, wave spring and compression or torsion spring.

Figure 4:
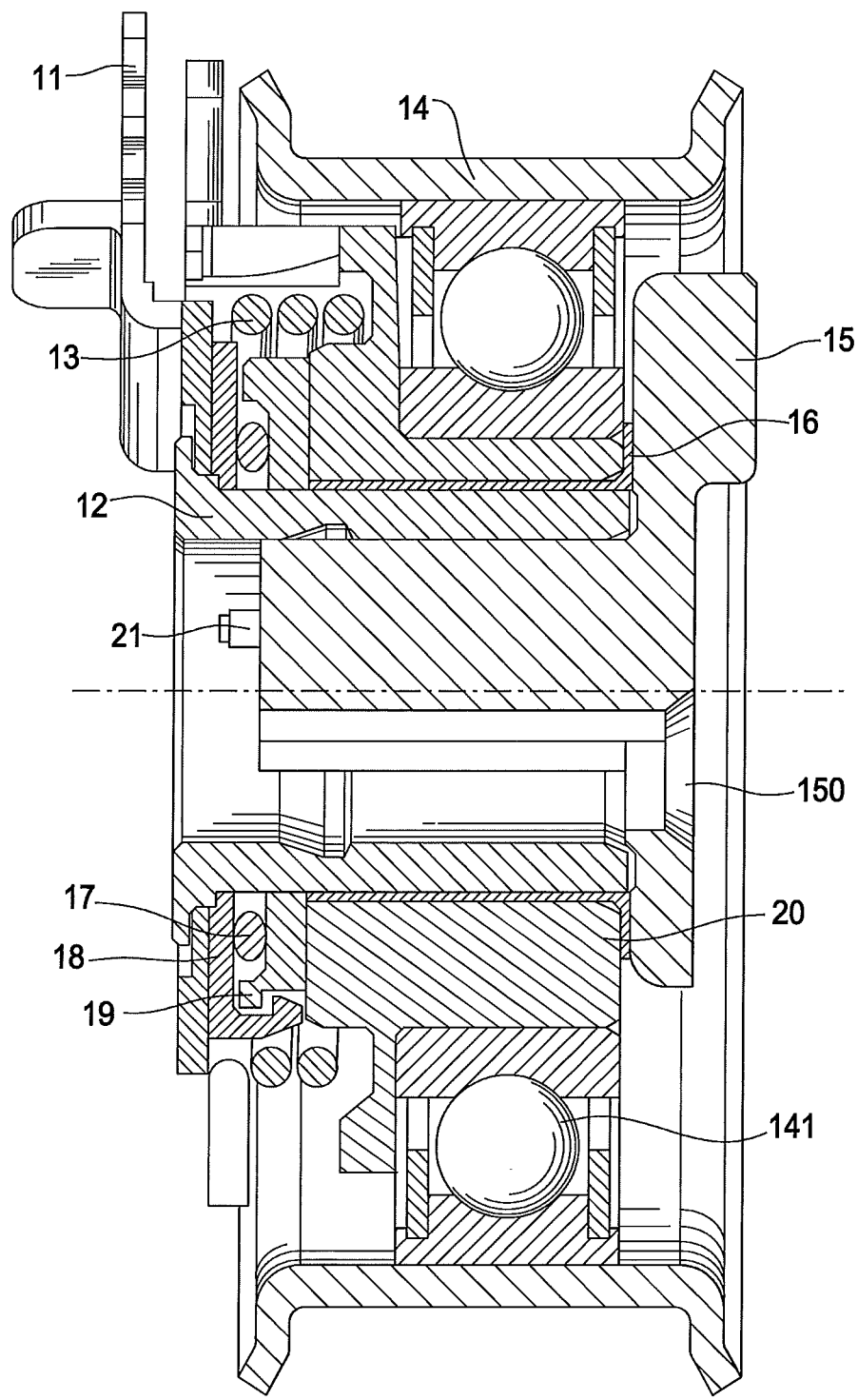
FIG. 4 is a cross-sectional view of an alternate embodiment.
Figure 5:
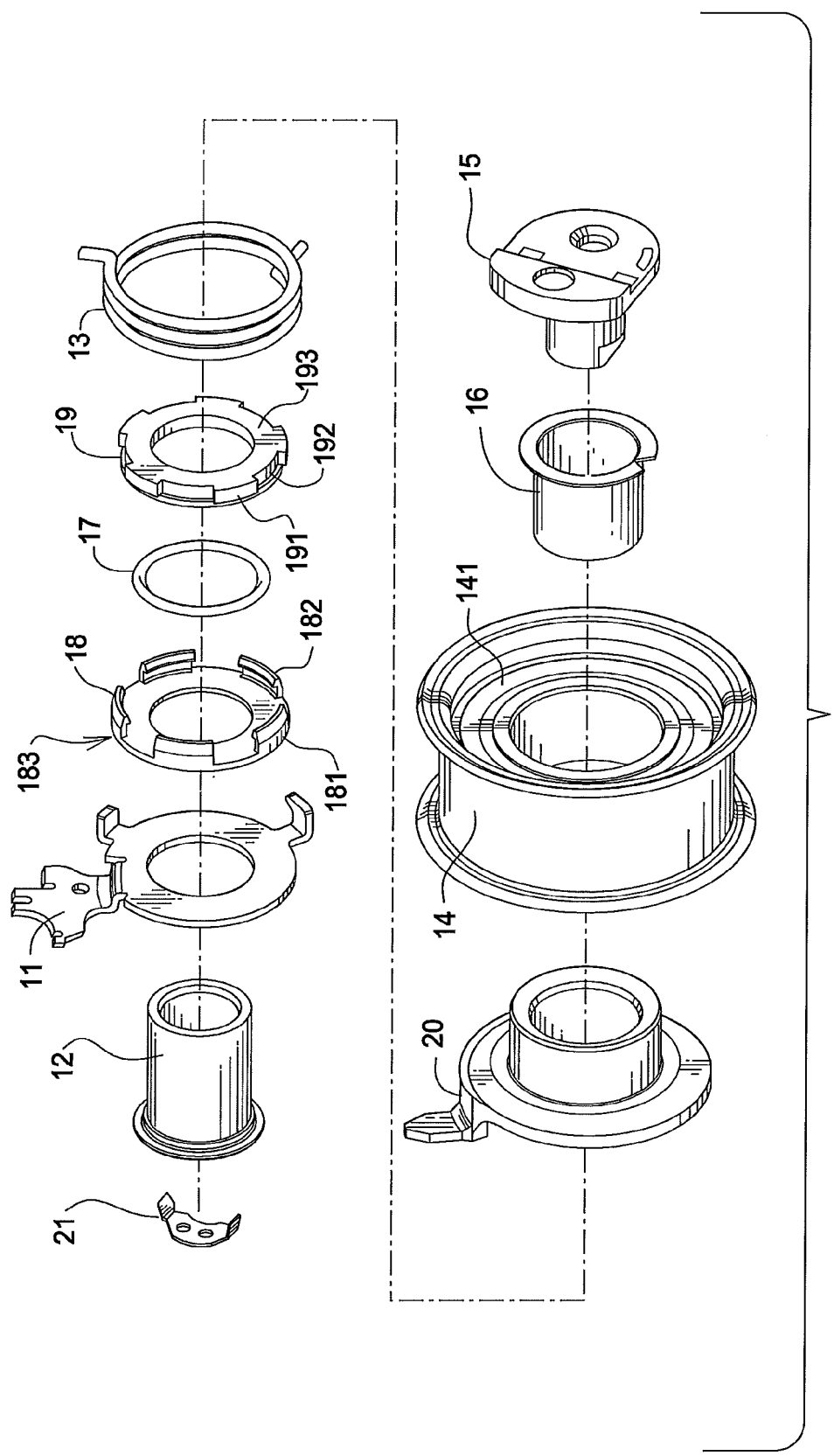
FIG. 5 is an exploded view of the alternate embodiment in FIG. 4.

FIG. 4 is a cross-sectional view of an alternate embodiment. FIG. 5 is an exploded view of the alternate embodiment in FIG. 4. FIGS. 4 and 5 describe an alternate embodiment where a spring loads two damping disks, 18, 19, that are fixed to rotate together thereby preventing the need to fix the damping disks to the arm 20 to be dampened. Damping disk 18 is in frictional contact with a static component, base 11, and the damping disk 19 is in frictional contact with the moving member, arm 20, to dampen the movement of the arm 20.

Eccentric adjuster 15 is an eccentric that is used to move the tensioner into proper engagement with the belt during installation. Eccentric refers to the center of hole 150 not being coaxial with a center of rotation of pulley 14 or of arm 12. Eccentric adjuster 15 is used to load the belt with a predetermined tension. Eccentric adjuster 15 is used only during belt installation and is locked in place once the belt is installed by fully engaging a fastener (not shown) through a hole 150 with a mounting surface. The fastener may comprise a bolt or any other suitable fastener known in the art.

Pulley 14 engages a belt to provide belt tension or load. Pulley 14 is journalled to arm 20 about a bearing 141, Pulley 14 is engaged with the bearing outer race. Bearing 141 comprises a ball bearing as shown, but could also comprise a needle bearing or other suitable bearing known in the art.

Arm 20 is biased by torsion spring 13 thereby urging pulley 14 into a belt (not shown). Pivotal movement of arm allows the tensioner to compensate for any changes in belt length as the belt stretches over time and as the drive length changes from thermal expansion or as engine load and therefor belt load changes. Arm 20 pivots about a low-friction bushing 16 on shaft 12. Shaft 12 is fixed to base 1.

Motion of arm 20 is damped by frictional contact with damping disk 19. Damping disk 19 is pressed into arm 20 by O-ring 17. O-Ring 17 comprises an elastomeric material and is used as a compressible resilient member to apply a normal force to damping disk 19 and damping disk 18. O-Ring 17 could be replaced by a wave spring, a compression spring, a Belleville spring, or other compressible resilient member having spring characteristics known in the art. Damping disk 18 is pressed by O-Ring 17 into base 11. Base 11 is fixed to a mounting surface such as an engine (not shown). Frictional surface 193 engages arm 20. Frictional surface 183 engages base 11. Damping is created by the resistant torque created by the frictional force of the contact between damping disk 18 and base 11, and damping disk 19 and arm 20.

Each tab 181 on damping disk 18 fits between two cooperating lug(s) 191 on damping disk 19. This arrangement fixes damping disk 18 and damping disk 19 so there is no relative rotation between the two but allows movement between these two components in the axial direction. Movement in the axial direction allows O-Ring 17 to apply a preload force to both damping disks 18, 19 and to compensate for manufacturing tolerances and wear. A lip 182 on each tab 181 engages a cooperating rim 192 on damping disk 19 to limit the relative axial movement of the damping disks 18, 19 by locking them together.

The assembly of damping disk 18 and damping disk 19 "floats" between the arm 20 and base 11. Neither damping disk 18 nor damping disk 19 are rotationally fixed to base 11 or arm 20.

Retainer 21 holds the assembly together axially. Retainer 21 is fixed to eccentric adjuster 15 and engages shaft 12 to hold the assembly axially.

Figure 7:
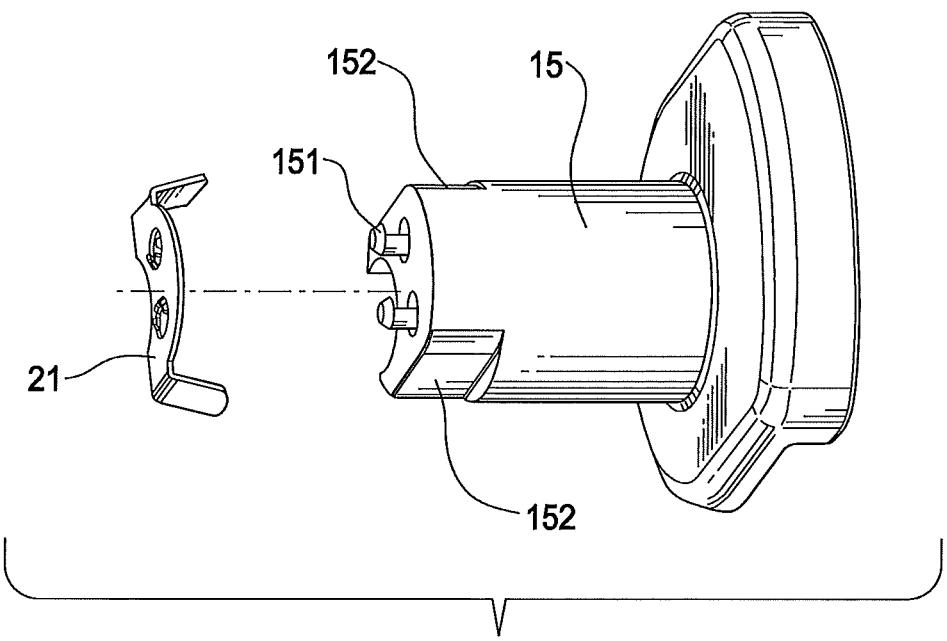
FIG. 7 is a detail of the retainer and adjuster.
Figure 10:
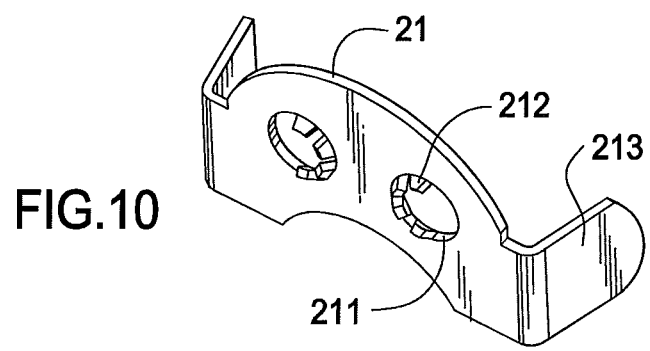
FIG. 10 is a detail of the retainer in FIG. 7.

FIG. 7 is a detail of the retainer and adjuster. Retainer 21 holds the assembly together when the tensioner is not mounted to an engine. Retainer 21 is attached to adjuster 15 by engagement of posts 151 and holes 211 and prongs 212. The two posts 151 prevent retainer 21 from rotating and prongs 212 retain retainer 21 on posts 151. FIG. 10 is a detail of the retainer in FIG. 7.

Figure 8:
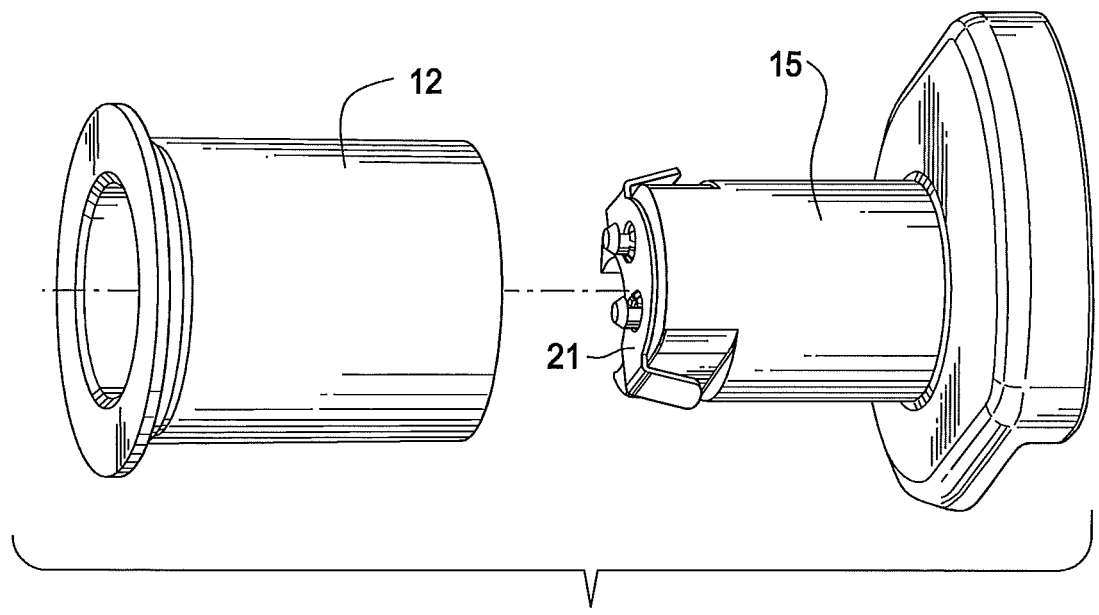
FIG. 8 is a detail of the retainer on the adjuster.
Figure 9:
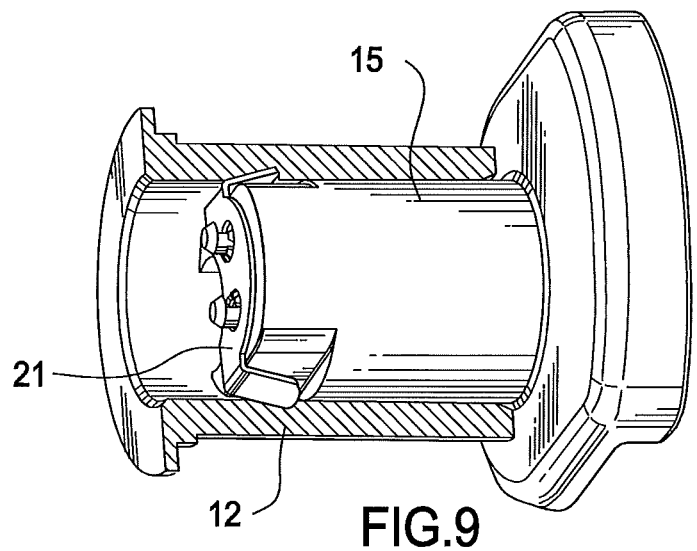
FIG. 9 is a detail of the assembled shaft and adjuster.
Figure 11:
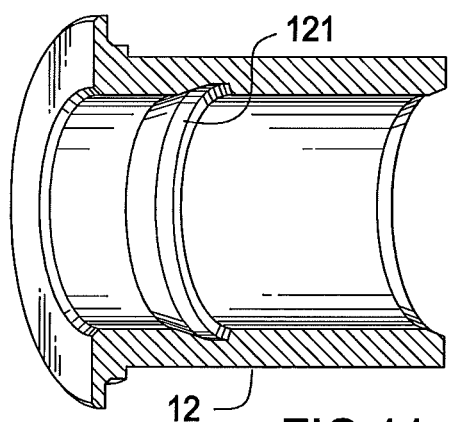
FIG. 11 is a cross sectional view of the shaft.

FIG. 8 is a detail of the retainer on the adjuster. The subassembly of retainer 21 and adjuster 15 is inserted into shaft 12. Tabs 213 are resiliently bent inward during assembly to allow retainer 21 to pass through the bore of shaft 12. Receiving portions 152 provide a space into which tabs 213 are bent. A circumferential groove 121 in shaft 12 allows tabs 213 to resiliently expand outward to lockingly engage shaft 12. FIG. 9 is a detail of the assembled shaft and adjuster. Relative axial movement of adjuster 15 and shaft 12 is restricted by interaction between the wall of groove 121 and the radially expanded tabs 213. FIG. 11 is a cross sectional view of the shaft.

Although a form of the invention has been described herein, it will be obvious to those skilled in the art that variations may be made in the construction and relation of parts and method without departing from the spirit and scope of the invention described herein.

We claim:

1. A tensioner comprising:
   a base (1);
   a shaft (2) connected to the base;
   an eccentric adjuster (8) coaxially engaged with the shaft;
   an arm (6) pivotally engaged with the shaft;
   a pulley (7) journalled to the arm;
   a torsion spring (3) engaged between the arm and the base;
   the arm comprising a first receiving portion (61) and a second receiving portion (62) disposed axially opposite from the first receiving portion;
   a first damping member (13) disposed between the arm and the base, the first damping member frictionally engaged with the base and engaged with first receiving portion (61);
   a second damping member (9) disposed between the arm and the eccentric adjuster having a member (91) engaged with the second receiving portion; and
   a biasing member (5) disposed between the first damping member and the arm applying a normal force to the first damping member and to the second damping member.

2. The tensioner as in claim 1, wherein the biasing member comprises a wave spring.

3. The tensioner as in claim 1, wherein the first damping member is a toroid.

4. The tensioner as in claim 1, wherein the second damping member comprises a disk.

5. The tensioner as in claim 1, wherein the first damping member and the second damping member are disposed on opposite axial ends of the arm.

* * * * *